(12) United States Patent
Eldesouk

(10) Patent No.: US 9,258,994 B2
(45) Date of Patent: Feb. 16, 2016

(54) APPARATUS AND METHOD FOR TREATING INFESTATION IN A WOODEN BODY

(71) Applicant: King Abdul Aziz City for Science and Technology, Riyadh (SA)

(72) Inventor: Munir Eldesouk, Riyadh (SA)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 274 days.

(21) Appl. No.: 13/633,138

(22) Filed: Oct. 2, 2012

(65) Prior Publication Data

US 2014/0090291 A1 Apr. 3, 2014

(51) Int. Cl.
*A01M 1/22* (2006.01)
*A01M 99/00* (2006.01)
*A01G 17/00* (2006.01)

(52) U.S. Cl.
CPC .............. *A01M 99/00* (2013.01); *A01G 17/00* (2013.01); *A01M 1/226* (2013.01)

(58) Field of Classification Search
CPC .... A01M 1/2011; A01M 1/026; A01M 1/226
USPC .......... 43/107, 108, 121, 124, 132.1
See application file for complete search history.

(56) References Cited

U.S. PATENT DOCUMENTS

| | | | | |
|---|---|---|---|---|
| 4,392,215 A * | 7/1983 | Hall | ............................. | 367/139 |
| 4,566,085 A * | 1/1986 | Weinberg | ...................... | 367/139 |
| 4,689,776 A * | 8/1987 | Thorndyke et al. | ........... | 367/139 |
| 4,933,918 A * | 6/1990 | Landsrath et al. | ............. | 367/139 |
| 5,113,881 A * | 5/1992 | Lin et al. | ............................ | 134/1 |
| 5,473,942 A * | 12/1995 | Vick et al. | ........................ | 73/587 |
| 5,832,657 A * | 11/1998 | Jan | ................................... | 43/124 |
| 6,347,551 B1 * | 2/2002 | Turpening et al. | .............. | 73/628 |
| 7,597,003 B2 * | 10/2009 | Hawwa et al. | ................... | 73/571 |
| 2009/0199457 A1 * | 8/2009 | Grigorov | .............. | A01M 1/026 43/99 |
| 2012/0271173 A1 * | 10/2012 | Li | ................................ | 600/443 |

FOREIGN PATENT DOCUMENTS

DE 102004061221 A1 * 6/2006
WO WO 2013043990 A1 * 3/2013 ............ A01M 1/226

* cited by examiner

*Primary Examiner* — David Parsley
*Assistant Examiner* — Michael Wang
(74) *Attorney, Agent, or Firm* — Timberline Patent Law Group PLLC

(57) ABSTRACT

An apparatus and method for treating infestation in a wooden body is provided. The apparatus comprises at least one transducer configured to deliver High Intensity Focused Ultrasound (HIFU) signals to at least one region of the wooden body. The method comprises scanning at least one part of the wooden body to identify at least one region of the wooden body infested with one or more pests. The method further comprises delivering HIFU signals to the at least one region of the wooden body infested with the one or more pests.

12 Claims, 5 Drawing Sheets

APPARATUS AND METHOD FOR TREATING INFESTATION IN A WOODEN BODY

FIELD OF THE INVENTION

The invention generally relates to treating infestation in a wooden body. More specifically, the invention relates to treating infestation in a wooden body using ultrasound signals.

BACKGROUND OF THE INVENTION

Pests affect a wide variety of wooden bodies ranging from household furniture to tree plantations. It is difficult to detect and remove or kill the pests residing inside the wooden bodies to prevent them from causing damage to the wooden bodies. This is because the infestation usually begins in a small region inside the wooden body. In this stage, the pests are relatively small and usually in a larva form. The size of the wooden bodies also poses a difficulty in detecting the infestation.

There are certain methods for detecting infestation inside wooden bodies. These methods include, but are not limited to, acoustic detection, electromagnetic detection and optical detection. These methods only assist in finding where the infestation is in the wooden bodies. There are a limited number of methods for treating the infestation within the wooden bodies.

One of most commonly used method for treating infestation inside wooden bodies is to burn down the wooden bodies affected by the infestation. This is particularly applicable for preventing the spread of pests in tree plantations. Other methods for treating infestation inside wooden bodies include use of ultrasound and microwave. The methods which use ultrasound do not use electronic focusing. Further, such methods attempt to treat infestation by raising the temperature of the entire wooden body. In such methods, the treatment is generally effective only in the regions nearest to the probes. The use of ultrasound signals in such a manner is generally not effective in treating infestation in wooden bodies. Further, such arbitrary application of temperature may be harmful to wooden bodies such as trees. The methods which use microwave radiation for treating infestation also have limitations. Firstly, the temperature of treatment drops rapidly with distance. Further, the application of microwave usually causes the surface of the wooden bodies to burn due to the high power applied on the surface. In addition, these methods do not focus the microwave radiation to specific regions within the wooden bodies.

In view of the above, there is a need for an improved apparatus and method for treating infestation in a wooden body.

BRIEF DESCRIPTION OF THE FIGURES

The accompanying figures wherein like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1A:
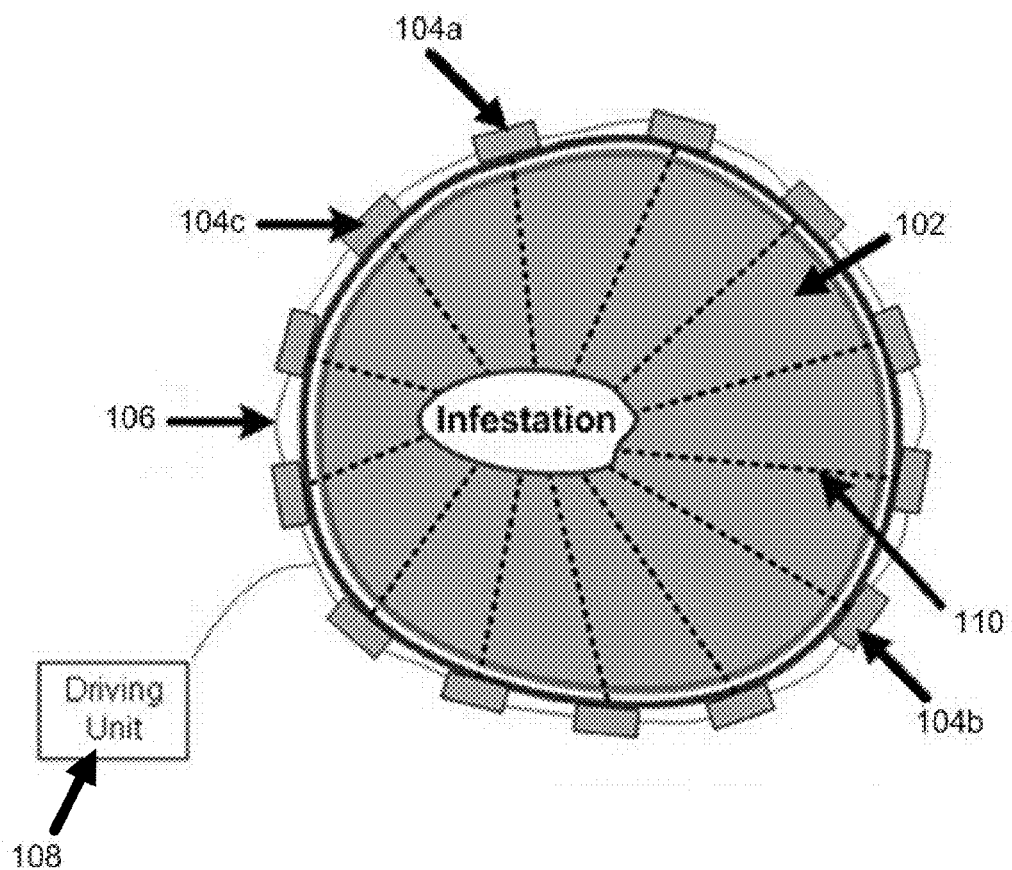
FIG. 1A illustrates a perspective view of an apparatus for treating infestation in a wooden body in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of apparatus components and method steps related to treating infestation in a wooden body. Accordingly, the apparatus components and method steps have been represented where appropriate by conventional symbols in the drawings, showing only those specific details that are pertinent to understanding the embodiments of the invention so as not to unnecessarily obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Generally speaking, pursuant to various embodiments, the invention provides an apparatus and a method for treating infestation in a wooden body. In various embodiments of the invention, the apparatus comprises at least one transducer. The at least one transducer is configured to deliver High Intensity Focused Ultrasound (HIFU) signals to at least one region of the wooden body infested with one or more pests. The apparatus further comprises a support structure attached with the at least one transducer. The support structure is configured to facilitate positioning of the at least one transducer with respect to the wooden body for delivering the HIFU signals to the at least one region of the wooden body infested with the one or more pests.

In an embodiment, the apparatus for treating infestation in the wooden body comprises a plurality of imaging transducers. In accordance with the embodiment, the plurality of imaging transducers are configured to transmit ultrasound signals for scanning at least one part of the wooden body for identifying at least one region of the wooden body infested with one or more pests. In addition, the apparatus comprises a plurality of HIFU transducers configured to deliver HIFU signals to the at least one region of the wooden body infested with the one or more pests. In accordance with the embodiment, the apparatus further comprises a support structure attached with the plurality of imaging transducers and the plurality of HIFU transducers. The support structure is configured to facilitate positioning of the plurality of imaging transducers with respect to the wooden body for transmitting the ultrasound signals for scanning the at least one part of the wooden body. In addition, the support structure is configured to facilitate positioning of the plurality of HIFU transducers with respect to the wooden body for delivering the HIFU signals to the at least one region of the wooden body infested with the one or more pests.

In various embodiments of the invention, the method for treating infestation in the wooden body comprises scanning at least one part of the wooden body. The at least one part of the wooden body is scanned to identify at least one region of the wooden body infested with one or more pests. The method further comprises delivering HIFU signals to the at least one region of the wooden body infested with the one or more pests.

FIG. 1A illustrates a perspective view of an apparatus 100 for treating infestation in a wooden body 102 in accordance with an embodiment of the invention. Wooden body 102 may be any body or article made of wood, which is infested with pests. For example, wooden body 102 may be part of a palm tree infested with red palm weevils. Similarly, wooden body 102 may be part of household furniture infested with pests. In accordance with the embodiment illustrated in FIG. 1A, apparatus 100 is attached with wooden body 102 for treating infestation in wooden body 102.

Figure 1B:
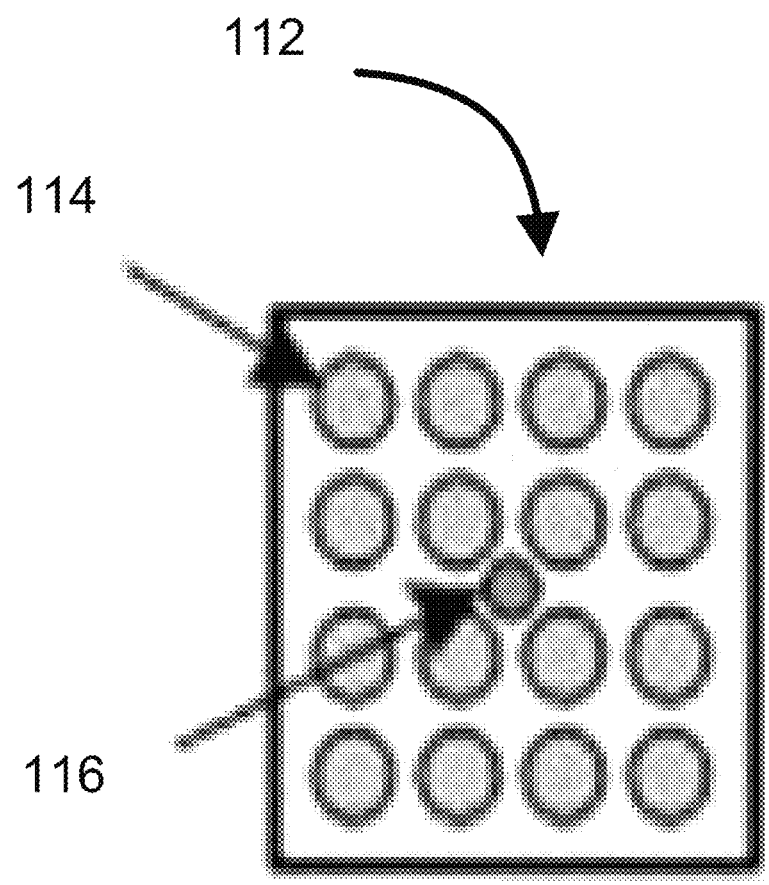
FIG. 1B illustrates a perspective view of a group of transducers in accordance with an embodiment of the invention.

As illustrated in FIG. 1A, apparatus 100 comprises one or more transducers. In an embodiment, the one or more transducers are divided into one or more groups of transducers such as, but not limited to, transducer group 104a, transducer group 104b and transducer group 104c. In an embodiment illustrated in FIG. 1B, each group of transducers such as group of transducers 112 comprises multiple High Intensity Focused Ultrasound (HIFU) transducers such as transducer 114 and at least one imaging transducer such as transducer 116. In accordance with the embodiment, the HIFU transducers are arranged in a 4×4 array and the at least one imaging transducer is positioned at the center of the 4×4 array. It will be apparent to those skilled in the art that the HIFU transducers and the at least one imaging transducer may be arranged in a different arrangement such as, but not limited to, a circular array arrangement and a rectangular array arrangement. Further, it will be apparent to those skilled in the art that the number of imaging transducers may also be varied and need not be limited to one as illustrated in FIG. 1B. In an embodiment, the groups of transducers are arranged in a circular fashion, as illustrated in FIG. 1A, for treating infestation in wooden body 102. Further, the groups of transducers are separated from each other by a predetermined distance as illustrated in FIG. 1A. It will be apparent to those skilled in the art that the arrangement of the one or more transducers need not be limited to the embodiment described above and numerous variations would be apparent to those skilled in the art.

Apparatus 100 further comprises a support structure 106. The one or more transducers are attached to wooden body 102 with the help of support structure 106. For example, the one or more transducers can be attached to a belt, which can be used to attach the one or more transducers with wooden body 102. The number of transducers to be attached with wooden body 102 may be determined based on one or more dimensions of wooden body 102. For example, if wooden body 102 is a part of a tree, then the number of transducers to be used may be determined based on the diameter of the part of the tree. The positioning of the one or more transducers with respect to each other can also be determined based on the one or more dimensions and shape of wooden body 102. In other words, how the one or more transducers need to be arranged about wooden body 102 can be determined based on the dimensions and shape of wooden body 102. For example, pairs of transducers may be placed opposite to each other if wooden body 102 is a wooden table. Similarly, multiple transducers may be placed along the periphery of wooden body 102 if wooden body 102 is the trunk of a tree.

In accordance with the embodiment, at least one transducer of the one or more transducers is configured to deliver High Intensity Focused Ultrasound (HIFU) signals to at least one region of wooden body 102 infested with one or more pests. In an embodiment of the invention, the at least one transducer is configured to deliver the HIFU signals to the at least one region of wooden body 102 for a predetermined amount of time. The amount of time for which the HIFU signals need to be delivered can be determined based on frequency and output power of the HIFU signals and the one or more dimensions and shape of wooden body 102. For example, the one or more transducers can be configured to deliver the HIFU signals for five minutes, wherein wooden body 102 is the trunk of a tree which has an overall diameter of about fifteen inches. Similarly, the one or more transducers can be configured to deliver the HIFU signals for two minutes, when wooden body 102 is a household furniture item which has a thickness of about five inches. Further, the number of transducers to be used for delivering the HIFU signals may be determined based on the location and size of the at least one region of wooden body 102 infested with the one or more pests. For example, if a tree has an overall diameter of fifteen inches, then ten transducers may be used. In addition, which transducers of the one or more transducers should be used may be determined based on the location and size of the at least one region of wooden body infested with the one or more pests. For example, a pair of transducers of the one or more transducers may be configured to deliver the HIFU signals. If wooden body 102 has dimensions of a bigger size, then a plurality of transducers may be used to deliver the HIFU signals for treating infestation in wooden body 102. Multiple locations in wooden body 102 may be infested with pests. Accordingly, the one or more transducers may be accordingly positioned about wooden body 102 for treating infestation in the multiple locations.

The one or more transducers need to positioned such that the HIFU signals are transmitted to wooden body 102 in such a way that the maximum intensity of the HIFU signals is focused at the at least one region of wooden body 102 infested with the one or more pests. In an embodiment, the transmission of the HIFU signals is controlled by a driving unit 108. Driving unit 108 is configured to control the phase difference between the HIFU signals transmitted by different transducers of the one or more transducers. It will be apparent to those ordinarily skilled in the art that varying the phase difference between the HIFU signals transmitted by the transducers increases the chances of focusing the maximum intensity of the HIFU signals at the at least one region of wooden body 102 infested with the one or more pests. In accordance with the embodiment, driving unit 108 comprises one or more software applications. The one or more software applications are configured to assist in selecting an appropriate phase for transmitting the HIFU signals from each transducer of the one or more transducers. It will be apparent to those ordinarily skilled in the art that such a controlled transmission of the HIFU signals further enhances the chances of focusing the maximum intensity of the HIFU signals at the at least one region of wooden body 102.

In an embodiment, the one or more transducers are configured to transmit one or more ultrasound signals such as an ultrasound signal 110. The one or more ultrasound signals can be transmitted from the one or more transducers at a frequency selected from a frequency range of 500 kilohertz (kHz) to 5 megahertz (MHz). Further, the frequency of the one or more ultrasound signals can be varied based on the dimensions of wooden body 102. The frequency of the one or more ultrasound signals are varied on the basis of thickness and internal composition of wooden body 102. For example, if wooden body 102 has bigger dimensions, then the frequency at which the one or more ultrasound signals are transmitted can be selected from a frequency range of 500 kHz to 5 MHz. It will be apparent to those skilled in art, that the frequency at which the one or more ultrasound signals need not be limited to the examples provided above and any suitable frequency may be used for treating the infestation in the at least one region of wooden body 102. In an embodiment, the power at which the one or more ultrasound signals are transmitted can be adjusted depending on the thickness and internal composition of wooden body 102. For example, power levels can be adjusted to increase the depth for treating infestation in thicker trees.

The at least one region of wooden body 102 infested with the one or more pests can be identified by scanning wooden body 102. In addition, the location and size of the at least one region of wooden body 102 infested with the one or more pests may be identified by scanning wooden body 102.

In an embodiment of the invention, the one or more transducers of apparatus 100 comprises at least one imaging transducer as illustrated in FIG. 1B. For example, each group of transducers such as transducer group 104a, transducer group 104b and transducer group 104c comprises at least one imaging transducer. The at least one imaging transducer is configured to transmit ultrasound signals for scanning at least one part of wooden body 102. The at least one part of wooden body 102 is scanned for identifying the at least one region of wooden body 102 infested with the one or more pests. It will be apparent to those ordinarily skilled in the art that wooden body 102 can be scanned using any suitable number of imaging transducers working either alone or in combination with each other. For example, wooden body 102 may be scanned by using a method where firstly an imaging transducer of transducer group 104a sends ultrasound signals and listens back for an echo. Thereafter, the imaging transducer of transducer group 104a sends ultrasound signals and an imaging transducer of transducer group 104b positioned diagonally opposite to transducer group 104a listens to ultrasound signals generated by the imaging transducer of transducer group 104a. This is repeated for each group of transducers of the one or more transducers until all the imaging transducers of the groups of transducers have transmitted ultrasound signals and listened for corresponding echo. When all the imaging transducers of the groups of transducers have transmitted and received ultrasound signals, an image of a horizontal cross section of wooden body 102 may be obtained. The groups of transducers may be placed at different locations in wooden body 102 to obtain different images of different horizontal cross section of wooden body 102. The different images may be obtained depending on thickness and internal composition of wooden body 102.

In an embodiment of the invention, apparatus 100 further comprises an imaging mechanism (not illustrated) operationally connected with the at one imaging transducer for generating one or more images of one or more parts of wooden body 102. In an embodiment, the imaging mechanism is configured to receive one or more signals from the imaging transducers of the groups of transducers. In accordance with the embodiment, the imaging mechanism is further configured to convert the one or more signals to the one or more images. In an embodiment, the imaging mechanism is configured to display the one or more images. In an embodiment, the imaging mechanism comprises a display module. The display module is configured to display the images. The display module can be operationally connected to the imaging transducers for generating and displaying images based on the signals received from the imaging transducers. In accordance with the embodiment, the display module can be any suitable display such as, but not limited to, a monitor and a television screen.

The one or more images are generated for identifying the at least one region of wooden body 102 infested with the one or more pests. In an embodiment, the imaging mechanism is operationally connected with the at least one transducer. In accordance with the embodiment, the imaging mechanism is configured to generate at least one topographical image of the at least one part of wooden body 102 for identifying the at least one region of the wooden body infested with the one or more pests.

Multiple images may be obtained for various parts of wooden body 102 by placing the imaging transducers at various positions along periphery of wooden body 102. For example, the imaging transducers may be initially positioned at first section of a tree to obtain one or more images of a cross section of the tree. Thereafter, the imaging transducers may be positioned at second section of the tree to obtain one or more images of another cross section of the tree. In a similar manner, different cross sectional images may be obtained to identify the regions in the tree infested with pests.

The imaging transducers need to be appropriately positioned with respect to wooden body 102 for scanning wooden body 102. Similarly, the groups of transducers need to be positioned appropriately with respect to wooden body 102 for delivering the HIFU signals to different regions of wooden body 102. In an embodiment of the invention, support structure 106 of apparatus 100 is attached with the one or more transducers. Support structure 106 is configured to facilitate positioning of the at least one imaging transducer for transmitting ultrasound signals for scanning the at least one part of wooden body 102 for identifying the at least one region of wooden body 102 infested with the one or more pests. Support structure 106 is also configured to facilitate positioning of the at least one transducer of the one or more transducers with respect to wooden body 102 for delivering the HIFU signals to the at least one region of wooden body 102 infested with the one or more pests.

Support structure 106 may be any suitable structure capable of supporting the one or more transducers for treating infestation in wooden body 102. In addition, support structure 106 should facilitate attachment of the one or more transducers with wooden body 102 for treating infestation in different regions of wooden body 102. In the embodiment illustrated in FIG. 1A, support structure 106 is a belt. The belt can comprise slots for housing the one or more groups of transducers. Alternately, the one or more groups of transducers can be rigidly attached with the belt. Thereafter, in order to treat infestation in wooden body 102, the belt with the one or more groups of transducers can be appropriately attached with wooden body 102 for treating infestation in wooden body 102. In an embodiment, the belt is manually affixed around a part of wooden body 102. In another embodiment, support structure 106 is a cable which is used to tie the one or more groups of transducers together. Thereafter, the cable with the one or more groups of transducers is wrapped around a part of wooden body 102.

Figure 2:
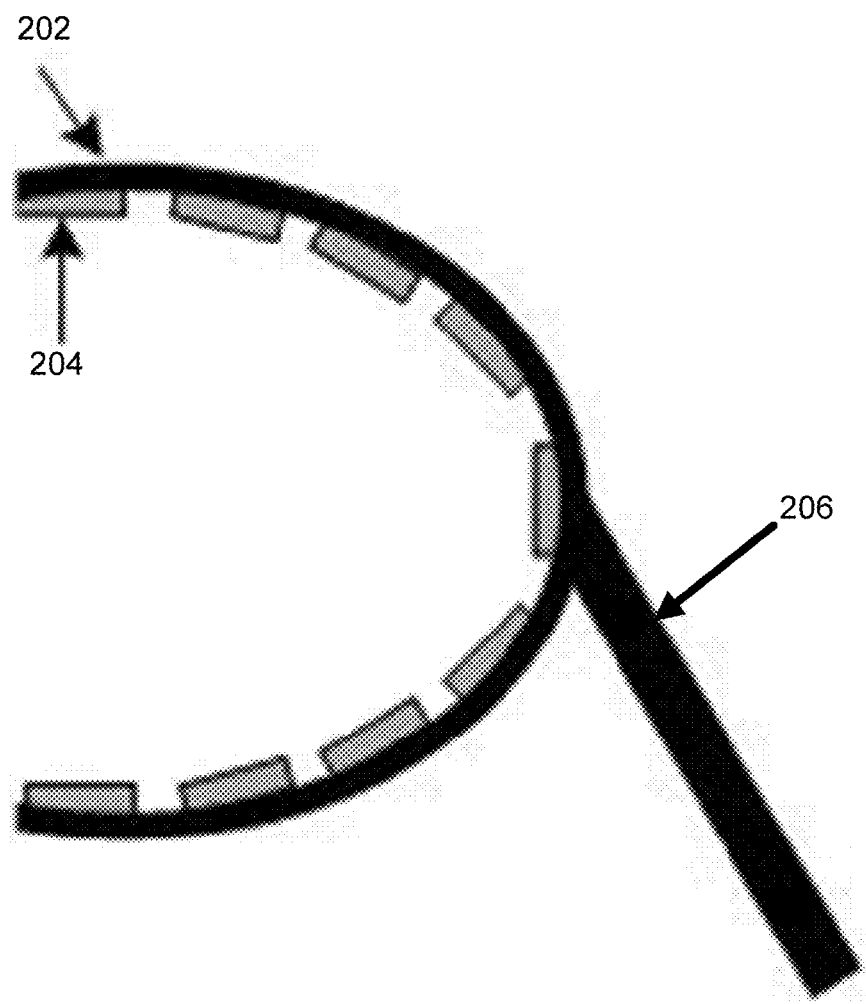
FIG. 2 illustrates a perspective view of a flexible c-shaped frame in accordance with an embodiment of the invention.

In yet another embodiment, support structure 106 comprises a flexible c-shaped frame 202. FIG. 2 illustrates a perspective view of flexible c-shaped frame 202 in accordance with an embodiment of the invention. In accordance with the embodiment, the one or more groups of transducers are attached with flexible c-shaped frame 202. Flexible c-shaped frame 202 comprises slots for housing one or more groups of transducers such as, but not limited to, transducer group 204. Alternately, the one or more groups of transducers can be rigidly attached with flexible c-shaped frame 202. Further, flexible c-shaped frame 202 is mechanically attached to with a rod 206 as illustrated in FIG. 2. In an embodiment, rod 206 comprises flexible dimensions and the length of rod 206 can be varied automatically for controlling the position of flexible c-shaped frame 202 about wooden body 102.

In an embodiment, flexible c-shaped frame 202 is designed such that the dimensions of flexible c-shaped frame 202 can be varied automatically based on the dimensions and shape of wooden body 102. It will be apparent to those skilled in the art that flexible c-shaped frame 202 can be designed such that flexible c-shaped frame 202 can be caused to elongate or contract based on the dimensions and shape of wooden body 102. The dimensions of flexible c-shaped frame 202 can be determined based on the dimensions and shape of wooden body 102. It will be apparent to those skilled in the art that the dimensions of flexible c-shaped frame 202 can be such that it can be used for treating infestation in wooden bodies having different dimensions and shapes. In addition, it will be apparent that such a design would facilitate attachment of flexible c-shaped frame 202 to wooden body 102 irrespective of the dimensions and shape of wooden body 102. In an embodiment, the one or more groups of transducers are attached with flexible c-shaped frame 202. Flexible c-shaped frame 202 can comprise slots for housing the one or more groups of transducers. Alternately, the one or more groups of transducers can be rigidly attached with c-shaped frame 202. It will be apparent to those skilled in the art that the number of transducers and the arrangement of the transducers about flexible c-shaped frame 202 can be determined based on the dimensions and shapes of the wooden bodies for which apparatus 100 is to be used.

Figure 3A:
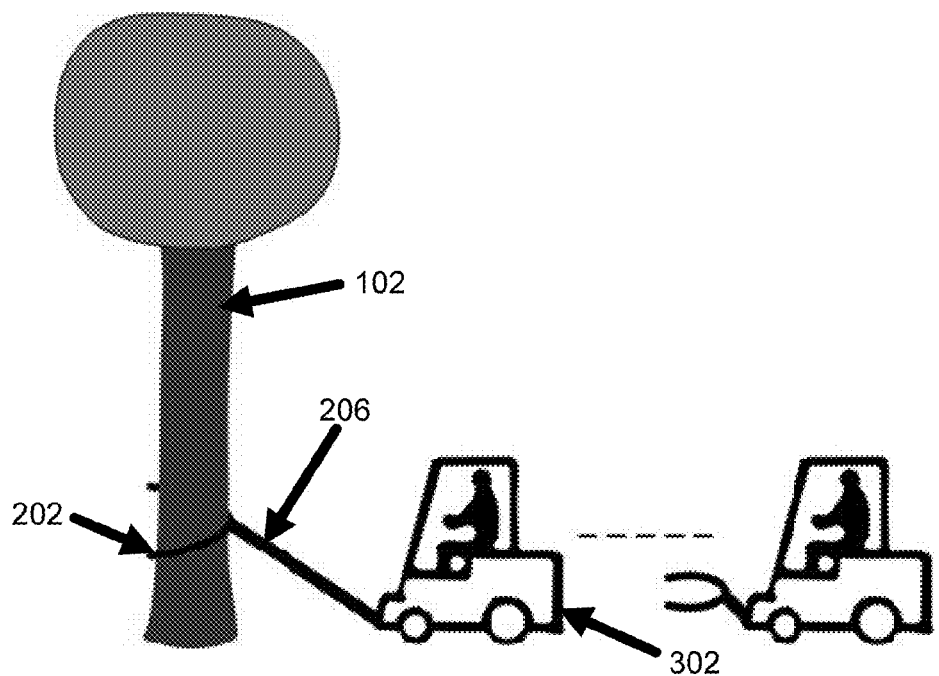
FIGS. 3A and 3B illustrate perspective views of operating the flexible c-shaped frame in accordance with an embodiment of the invention.
Figure 3B:
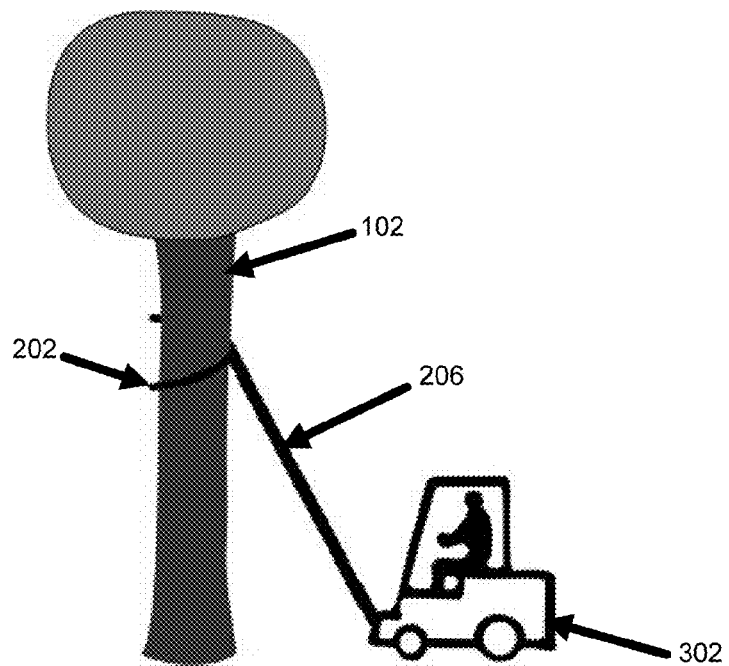

FIG. 3A and FIG. 3B illustrate perspective views of operating the flexible c-shaped frame 202 in accordance with an embodiment of the invention. In accordance with the embodiment, flexible c-shaped frame 202 is mechanically attached to rod 206. Rod 206 is mounted on a vehicle 302 and moved near wooden body 102. In addition, rod 206 is designed to facilitate automatic movement of flexible c-shaped frame 202 along the periphery of wooden body 102. Rod 206 can elongate or contract in order to facilitate positioning of flexible c-shaped frame 202 for identifying the at least one region of wooden body 102 infested with the one or more pests as well as for delivering the HIFU signals to the at least one region of wooden body 102. It will be apparent to those skilled in the art that rod 206 can be automatically manipulated to control the positioning of flexible c-shaped frame 202 for treating infestation in wooden body 102, In accordance with various embodiments of the invention, support structure 106 needs to be appropriately positioned with respect to wooden body 102 such that the one or more transducers are appropriately positioned with respect to wooden body 102 for scanning wooden body 102 or for treating infestation in different regions of wooden body 102. In an embodiment, support structure 106 can be controlled using an appropriate controlling mechanism (not illustrated) for scanning wooden body 102 for identifying the at least one region of wooden body 102 infested with the one or more pests. The controlling mechanism can also be used for controlling support structure 106 for delivering the HIFU signals to the at least one region of wooden body 102. In addition, the controlling mechanism can be used to control the positioning of the one or more transducers with respect to wooden body 102 for scanning wooden body 102. Similarly, the controlling mechanism can be used to control the positioning of the one or more transducers with respect to wooden body 102 for treating infestation in wooden body 102.

In an embodiment, the controlling mechanism is a position control mechanism (not illustrated) operationally connected with support structure 106. For example, the position control mechanism can be an electronically operable c-arm. In accordance with the embodiment, the position control mechanism is configured to mechanically position support structure 106 such that the at least one imaging transducer is positioned for scanning the at least one part of wooden body 102 for identifying the at least one region of wooden body 102 infested with the one or more pests. The position control mechanism is further configured to mechanically position support structure 106 such that the at least one transducer of the one or more transducers is appropriately positioned for delivering the HIFU signals to the at least one region of wooden body 102 infested with the one or more pests. In an embodiment of the invention, the position control mechanism is a robotic arm. The robotic arm is operationally connected with the flexible c-shaped frame 202 and is configured to move flexible c-shaped frame 202 along a periphery of wooden body 102. Further, the robotic arm is configured to manipulate the dimensions of flexible c-shaped frame 202 by elongating or contracting the flexible c-shaped frame 202 according to the dimensions of wooden body 102. In accordance with the embodiment illustrated in FIGS. 2, 3A and 3B, the robotic arm connected with flexible c-shaped frame 202 is rod 206.

In accordance with the embodiment illustrated in FIGS. 2, 3A and 3B, vehicle 302 comprises a control unit (not illustrated) configured to control the position of flexible c-shaped frame 202 for treating infestation in wooden body 102. The control unit is further configured to enable generation of ultrasound signals for generating the one or more images. In addition, the control unit is configured to enable transmission of HIFU signals for treating infestation in wooden body 102.

Figure 4:
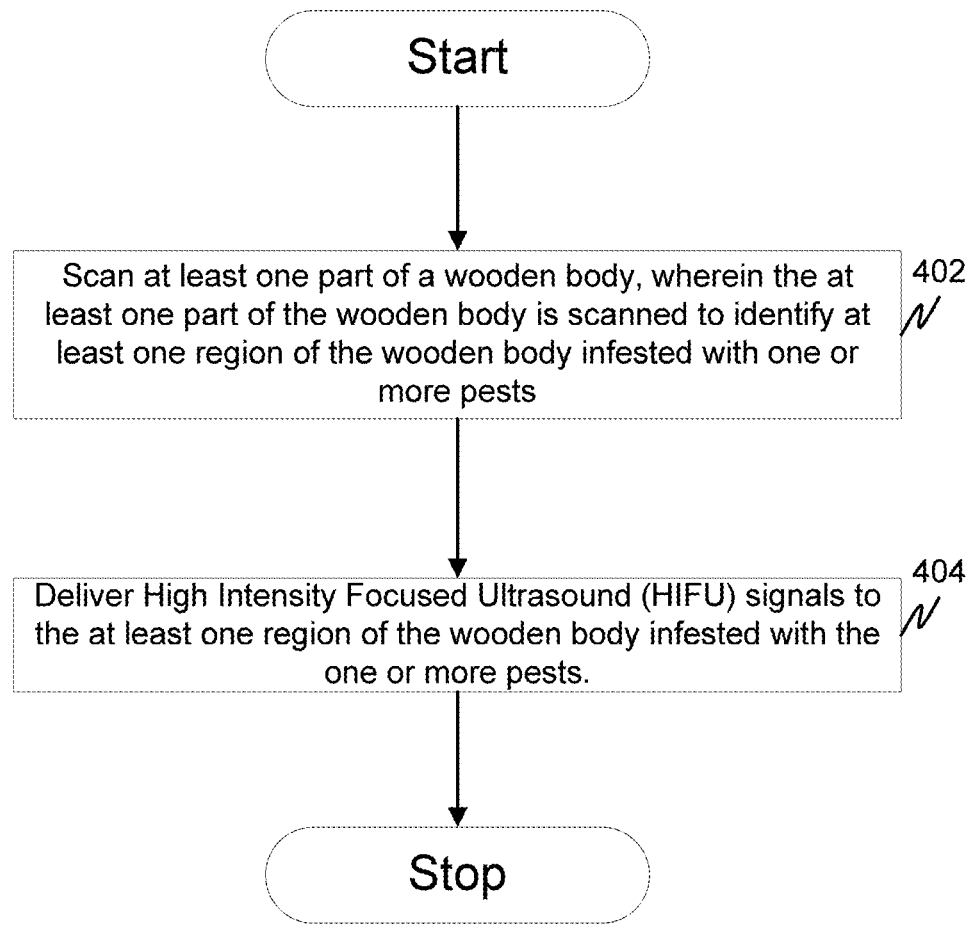
FIG. 4 illustrates a flow diagram of a method for treating infestation in a wooden body in accordance with an embodiment of the invention.

FIG. 4 illustrates a flow diagram of a method for treating infestation in a wooden body in accordance with an embodiment of the invention.

At step 402, one or more parts of the wooden body are scanned. The one or more parts of the wooden body are scanned to identify at least one region of the wooden body infested with one or more pests.

In an embodiment, the one or more parts of the wooden body are scanned using ultrasound signals to identify one or more regions in the wooden body infested with pests. In an embodiment of the invention, one or more imaging transducers are used for scanning the one or more parts of the wooden body. The number of imaging transducers to be used can be determined based on dimensions and shape of the wooden body. Further, the arrangement of the imaging transducers with respect to each other for scanning the wooden body can be determined based on the dimensions mad shape of the wooden body.

In accordance with the embodiment, the one or more imaging transducers are placed at one or more positions of the wooden body for scanning the one or more parts of the wooden body. The one or more imaging transducers may be placed at the one or more positions using a support structure. Thereafter, an imaging transducer of the one or more imaging transducers transmits one or more ultrasound signals for scanning a part of the wooden body. Thereafter, the imaging transducer listens for an echo of the one or more ultrasound signals. Similarly, another imaging transducer of the one or more transducers imaging transmits one or more ultrasound signals for scanning the part of the wooden body and listens for an echo of the one or more ultrasound signals. This process is repeated until each imaging transducer of the one or more imaging transducers has transmitted one or more ultrasound signals and listened to the corresponding echo. When each imaging transducer has transmitted the one or more ultrasound signals and listened to the corresponding echo, an image of a horizontal cross section of the part of the wooden body may be obtained. It will be apparent to those skilled in the art that the step can be repeated to obtain images of different cross sections of different parts of the wooden body.

In an embodiment, the one or more parts of the wooden body are scanned for generating one or more images of a horizontal cross section of the wooden body. The one or more images assist in identifying regions inside the wooden body infested with pests. Multiple images may be obtained for multiple parts of the wooden body by placing the one or more transducers at various positions along periphery of the wooden body. In an embodiment, at least one part of the wooden body is scanned using ultrasound signals. In addition, the at least one part is scanned for generating at least one topographical image of the at least one part of the wooden body. The at least one topographical image is generated to identify at least one region of the wooden body infested with one or more pests.

At step 404, High Intensity Focused Ultrasound (HIFU) signals are delivered to the identified region which is infested with pests. In an embodiment, the HIFU signals are delivered for a predetermined amount of time. The amount of time for which the HIFU signals need to be delivered can be determined based on the dimensions and shape of the wooden body, size of infestation and frequency and power of the HIFU signals. In an embodiment of the invention, the HIFU signals are delivered to the at least one region of the wooden body infested with one or more pests. In addition, the HIFU signals are delivered to the at least one region for a predetermined amount of time for treating the infestation in the at least one region.

In an embodiment of the invention, one or more HIFU transducers are used for delivering the HIFU signals. The one or more HIFU transducers can transmit the HIFU signals for the predetermined amount of time. In accordance with the embodiment, the one or more HIFU transducers are appropriately positioned with respect to the wooden body for delivering the HIFU signals for treating the infestation. It will be apparent to those skilled in the art that the one or more HIFU transducers need to be appropriately positioned with respect to the wooden body for treating the infestation in the wooden body. The one or more HIFU transducers can be appropriately positioned using a support structure such as support structure 106. Other appropriate mechanisms can be used for positioning the one or more HIFU transducers for treating the infestation in the wooden body. Further, the wooden body may be infested at multiple regions. Accordingly, the HIFU signals can be delivered at the different regions for treating the infestation in the wooden body.

The one or more imaging transducers and the one or more HIFU transducers can be controlled using an appropriate control mechanism. The control mechanism can be used for positioning the one or more imaging transducers for scanning the wooden body or for positioning the HIFU transducers for delivering the HIFU signals. In addition, the control mechanism can be used to control the frequency and power of one or more of the ultrasound signals and the HIFU signals by one of the one or more imaging transducers and the one or more HIFU transducers. The control mechanism can also be used to adjust the phase difference between the ultrasound signals or the HIFU signals generated by different transducers.

Thus, the apparatus and method described above provides an efficient way for treating infestation in a wooden body. Since the apparatus and method deliver HIFU signals at regions infested with pests, the chances to remove or kill the pests' increases significantly. Further, application of HIFU signals at a particular region only heats the particular region on which the HIFU signals are applied, thereby preventing damage to other portions of the wooden body. The apparatus is portable and has flexible dimensions, and can therefore be used for treating infestation in different types of wooden bodies having different dimensions.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features, of the invention.

What is claimed is:

1. An apparatus for treating infestation in a wooden body, the apparatus comprising:
   a belt wrappable and fastenable around a tree or wooden body;
   multiple arrays positioned at regular intervals on the belt;
   each array including a 4×4 grid comprising sixteen High Intensity Focused Ultrasound (HIFU) transducers;
   each array also including an imaging transducer;
   a controller for activating each imaging transducer of each array in a sequence, wherein each imaging transducer transmits an ultrasound signal through the tree or wooden body to an imaging transducer in an array positioned on the opposite side of the tree or wooden body, wherein the imaging transducer on the opposite side of the tree or wooden body receives a transmitted ultrasound signal echo, until all of the imaging transducers of all the arrays have received an ultrasound signal echo in sequence;
   the controller generating an image of a horizontal cross section of the tree or wooden body; and
   a driving unit to determine a phase difference between the HIFU signals to be transmitted by each of the multiple arrays, for focusing a maximum intensity of the HIFU signals at a place of infestation in the tree or wooden body, the place of infestation based on the image; and
   a support structure configured to facilitate positioning of the belt around the tree or wooden body.

2. The apparatus of claim 1, wherein each array is configured to deliver the HIFU signals for a predetermined amount of time based on the image.

3. The apparatus of claim 1 further comprising an imaging mechanism operationally connected with the at least one imaging transducer, wherein the imaging mechanism is configured to generate at least one topographical image of the at least one part of the wooden body for identifying the at least one region of the wooden body infested with the one or more pests.

4. The apparatus of claim 1, wherein the support structure is one of a belt and a flexible c-shaped frame, wherein a size of the support structure is based on a dimension of the wooden body.

5. The apparatus of claim 1 further comprising a position control mechanism operationally connected with the support structure, wherein the position control mechanism is configured to mechanically position the support structure such that the at least one transducer is positioned for delivering the HIFU signals to the at least one region of the wooden body infested with the one or more pests.

6. The apparatus of claim 5, wherein the position control mechanism is further configured to mechanically move the support structure for scanning at least one part of the wooden body for identifying the at least one region of the wooden body infested with the one or more pests.

7. The apparatus of claim 6, wherein the position control mechanism is a robotic arm.

8. An apparatus for treating infestation in a wooden body, the apparatus comprising:
 a belt wrappable and fastenable around a tree or wooden body;
 multiple arrays positioned at regular intervals on the belt;
 each array including a 4×4 grid comprising sixteen High Intensity Focused Ultrasound (HIFU) transducers;
 each array also including a single imaging transducer;
 a controller for activating in a sequence each single imaging transducer of each array of the multiple arrays to transmit an ultrasound signal through the tree or wooden body to an opposing array on the opposite side of the tree or wooden body, wherein the opposing array receives a transmitted ultrasound signal echo, until all of the single imaging transducers of all the arrays have transmitted an ultrasound signal in sequence and have received an ultrasound signal echo;
 the controller generating an image of a horizontal cross section of the tree or wooden body; and
 a driving unit to determine a phase difference between the HIFU signals to be transmitted by each of the multiple arrays, for focusing a maximum intensity of the HIFU signals at a place of infestation in the tree or wooden body, the place of infestation based on the image.

9. A method for treating infestation in a wooden body, the method comprising:
 scanning at least one part of the wooden body, wherein the at least one part of the wooden body is scanned to identify at least one region of the wooden body infested with one or more pests;
 the scanning further comprising wrapping a belt around the wooden body;
 the belt including multiple arrays positioned at regular intervals on the belt;
 each array including a 4×4 grid comprising sixteen High Intensity Focused Ultrasound (HIFU) transducers;
 each array also including an imaging transducer;
 activating in a sequence each imaging transducer of each array of the multiple arrays to transmit an ultrasound signal through the wooden body to an opposing array on the opposite side of the wooden body, wherein the opposing array receives a transmitted ultrasound signal echo, until all of the imaging transducers of all the arrays have transmitted an ultrasound signal in sequence and have received an ultrasound signal echo;
 generating an image of a horizontal cross section of the wooden body based on the sequence of ultrasound signal echoes received;
 determining a phase difference between the HIFU signals to be transmitted by each of the multiple arrays for focusing a maximum intensity of the HIFU signals at a place of infestation in the wooden body, the place of infestation based on the image;
 and
 focusing the HIFU signals to the place of infestation via the phase differences determined for each array on the belt.

10. The method of claim 9, wherein the HIFU signals are delivered to the at least one region of the wooden body infested with the one or more pests for a predetermined period of time.

11. The method of claim 9 further comprising generating at least one topographical image of the at least one part of the wooden body, wherein the at least one topographical image is generated to identify the at least one region of the wooden body infested with the one or more pests.

12. The method of claim 11, wherein the HIFU signals are delivered to the at least one region of the wooden body infested with the one or more pests based on the at least one topographical image.

\* \* \* \* \*